(12) United States Patent
Williams et al.

(10) Patent No.: US 7,481,965 B2
(45) Date of Patent: Jan. 27, 2009

(54) APPARATUS FOR INJECTING GAS INTO A VESSEL

(75) Inventors: Trevor Williams, Boweya via Glenrowan (AU); John Adrian Calvi, South Oakleigh (AU)

(73) Assignee: Technological Resources PTY Limited, Melbourne (AU)

( * ) Notice: Subject to any disclaimer, the term of this patent is extended or adjusted under 35 U.S.C. 154(b) by 307 days.

(21) Appl. No.: 11/249,504

(22) Filed: Oct. 14, 2005

(65) Prior Publication Data

US 2006/0108723 A1    May 25, 2006

(30) Foreign Application Priority Data

Oct. 15, 2004    (AU) ............................. 2004906004

(51) Int. Cl.
*C21C 7/00* (2006.01)

(52) U.S. Cl. ...................................... 266/217; 266/268

(58) Field of Classification Search ............... 266/216, 266/217, 241, 265, 268, 271
See application file for complete search history.

(56) References Cited

U.S. PATENT DOCUMENTS

| 6,440,356 | B2 * | 8/2002 | Dunne ......................... 266/225 |
| 6,673,305 | B2 * | 1/2004 | Dunne et al. ................. 266/225 |
| 6,939,391 | B2 * | 9/2005 | Dry et al. .................... 266/225 |
| 2001/0033046 | A1 * | 10/2001 | Dunne ......................... 266/217 |
| 2002/0158377 | A1 * | 10/2002 | Dunne et al. ................. 266/217 |
| 2003/0011114 | A1 * | 1/2003 | Dunne et al. ................. 266/225 |
| 2003/0164066 | A1 * | 9/2003 | Dry et al. .................... 266/216 |
| 2007/0119966 | A1 * | 5/2007 | Dry et al. ..................... 239/88 |

* cited by examiner

*Primary Examiner*—Scott Kastler
(74) *Attorney, Agent, or Firm*—Finnegan, Henderson, Farabow, Garrett and Dunner, L.L.P.

(57) ABSTRACT

Apparatus for injecting gas into a vessel including a gas flow duct 31 which receives hot gas through a gas inlet structure 32 at a rear end of the duct. An elongate central structure 33 extends throughout the length of duct 31 and carries a series of vanes 34 for imparting swirl to the gas flow exiting the forward end of the duct. The forward end of the duct 31 has an internally water cooled tip 36 and water flows to and from tip 36 through annular passages 43, 44 in the wall of duct 31. Vanes 34 are mounted on central structure 33 so as to extend to forward ends disposed within the duct tip 36 and are dimensioned such that during operation of the apparatus their forward ends are engaged and supported by the internally water cooled duct tip 36.

9 Claims, 5 Drawing Sheets

APPARATUS FOR INJECTING GAS INTO A VESSEL

TECHNICAL FIELD

The present invention provides an apparatus for injecting gas into a vessel. It has particular, but not exclusive application to apparatus for injecting a flow of gas into a metallurgical vessel under high temperature conditions. Such metallurgical vessel may for example be a smelting vessel in which molten metal is produced by a direct smelting process.

A known direct smelting process, which relies on a molten metal layer as a reaction medium, and is generally referred to as the HIsmelt process, is described in International application PCT/AU96/00197 (WO 96/31627) in the name of the applicant.

The HIsmelt process as described in the International application comprises:
 (a) forming a bath of molten iron and slag in a vessel;
 (b) injecting into the bath:
  (i) a metalliferous feed material, typically metal oxides; and
  (ii) a solid carbonaceous material, typically coal, which acts as a reductant of the metal oxides and a source of energy; and
 (c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. To promote effective post combustion of the gases in the upper part of the vessel, it is desirable that the incoming hot air blast exit the lance with a swirling motion. To achieve this, the outlet end of the lance may be fitted with internal flow guides to impart an appropriate swirling motion. The upper regions of the vessel may reach temperatures of the order of 2000° C. and the hot air may be delivered into the lance at temperatures of the order of 1100-1400° C. The lance must therefore be capable of withstanding extremely high temperatures both internally and on the external walls, particularly at the delivery end of the lance which projects into the combustion zone of the vessel.

U.S. Pat. No. 6,440,356 discloses a gas injection lance construction designed to meet the extreme conditions encountered in the HIsmelt process. In that construction, the flow guides are in the form of spiral vanes mounted on a central body at the forward end of a gas flow duct and those vanes are connected to the wall of the gas flow duct and are internally water cooled by cooling water which flows through supply and return passages within the wall of the duct. U.S. Pat. No. 6,673,305 discloses an alternative lance construction in which spiral flow guide vanes are mounted on a central tubular structure extending throughout the length of the gas flow duct. The central structure is provided with water flow passages which provide for the flow of cooling water to the front part of the central structure which is located generally within the tip of the gas flow duct. In that construction, the flow guide vanes are not cooled and are set back from the tip of the duct within a refractory lined wall section of the duct. The present invention provides a new lance construction which provides improved support for the guide vanes in a manner which enables reliable operation under high temperature conditions.

DISCLOSURE OF THE INVENTION

According to the invention there is provided apparatus for injecting gas into a vessel, including
 a gas flow duct extending from a rear end to a forward end from which to discharge gas from the duct;
 an elongate central structure extending within the gas flow duct from its rear end to its forward end;
 a plurality of flow directing vanes disposed about the central structure adjacent the forward end of the duct to impart swirl to a gas flow through the forward end of the duct;
 cooling water supply and return passages extending through the wall of the gas flow duct and extending from the rear end to the forward end of the gas flow duct for supply and return of cooling water to the forward end of the duct; and
 an annular duct tip disposed at the forward end of the duct and having an internal cooling water passage connecting with the cooling water supply and return passages so as to receive and return a flow of cooling water to internally cool the duct tip;
 wherein the flow directing vanes are mounted on the central structure so as to extend to forward ends disposed within the duct tip and dimensioned such that during operation of the apparatus their forward ends are engaged and supported by the internally water cooled duct tip.

The vanes may extend along the central structure from rear ends set rearwardly from the duct tip to their forward ends disposed within that tip.

The forward ends of the vanes may terminate within a rearmost part of the duct tip so as to be engaged only by that rearmost part of the tip.

The rearmost part of the duct tip may be formed with an annular rear wall extending outwardly from an inner peripheral wall of the tip and a wall of the gas flow duct. The rear wall of the tip may be formed with a deformable midsection to accommodate radial loading on the wall on engagement with the front ends of the vanes.

The rear wall of the duct tip may be in the form of an annulus and the midsection may be provided with a deformable corrugation extending around the annulus.

The corrugation may be generally of U-shaped cross-section.

The wall of the gas flow duct may comprise three concentric tubes defining inner and outer annular spaces providing the cooling water supply and return passages.

The forward ends of the duct tubes may be connected to the duct tip.

The duct tip may be of hollow annular formation and internally divided by a partitioning structure to form said cooling water passage in the tip.

BRIEF DESCRIPTION OF THE DRAWINGS

In order that the invention may be more fully explained one particular embodiment will be described in some detail with reference to the accompanying drawings in which.

DETAILED DESCRIPTION OF THE PREFERRED EMBODIMENT

Figure 1:
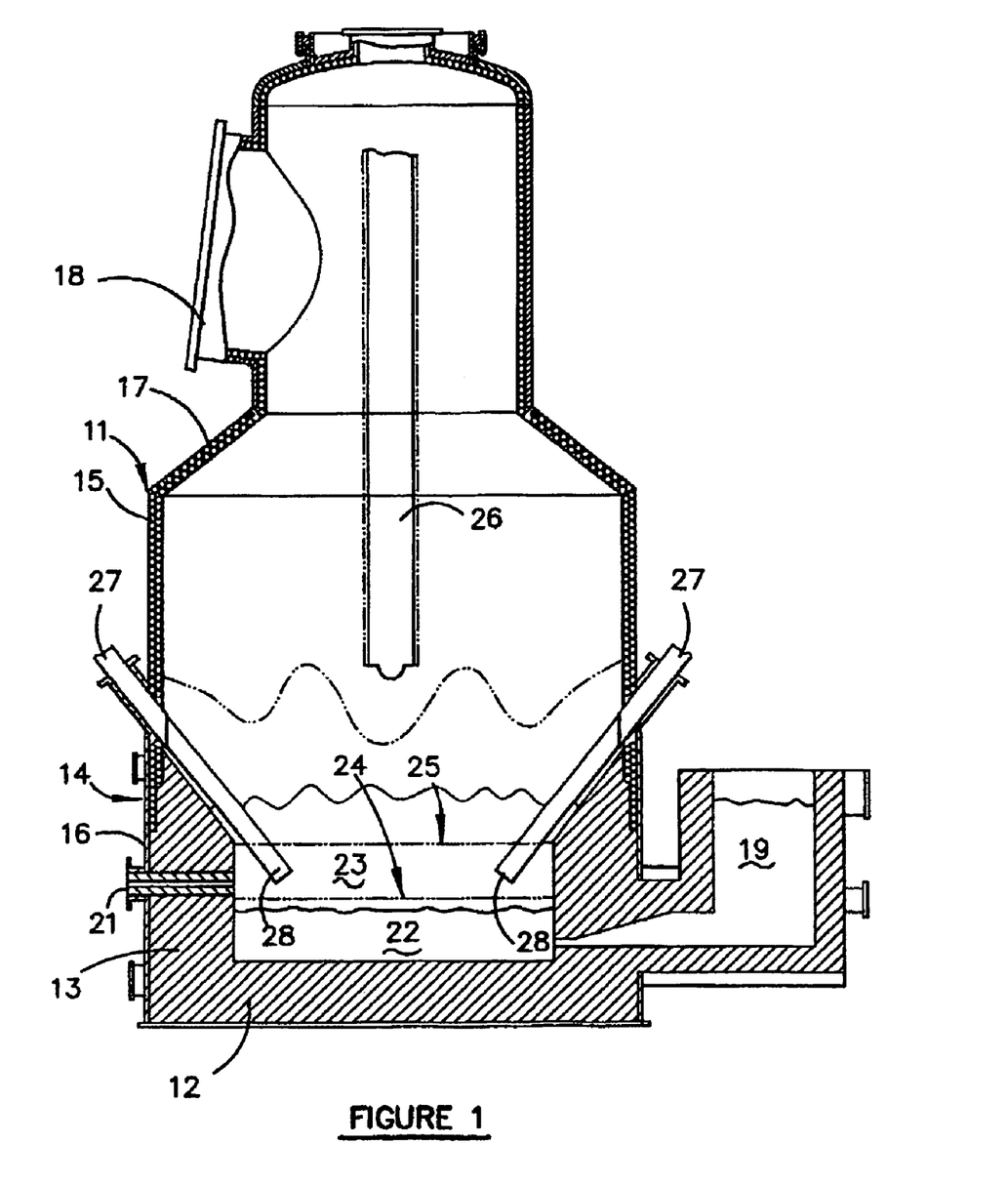
FIG. 1 is a vertical section through a direct smelting vessel incorporating a hot air injection lance constructed in accordance with the invention.

FIG. 1 illustrates a direct smelting vessel suitable for operation by the HIsmelt process as described in International Patent Application PCT/AU96/00197. The metallurgical vessel is denoted generally as 11 and has a hearth that includes a base 12 and sides 13 formed from refractory bricks; side walls 14 which form a generally cylindrical barrel extending upwardly from the sides 13 of the hearth and which includes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a hot air blast into an upper region of the vessel and solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

The construction of the hot air injection lance 26 is illustrated in FIGS. 2 to 9. As shown in these figures lance 26 comprises an elongate duct 31 which receives hot gas through a gas inlet structure 32 and injects it into the upper region of a vessel. An annular duct tip 36 is disposed at the forward end of the gas flow duct 31. The lance includes an elongate central tubular structure 33 which extends within the gas flow duct 31 from its rear end to its forward end. Adjacent the forward end of the duct, central structure 33 carries a series of swirl imparting vanes 34 for imparting swirl to the gas flow exiting the duct. Swirl vanes 34 may be formed to a four start helical configuration. Their inlet (rear) ends may have a smooth transition from initial straight sections to a fully developed helix to minimise turbulence and pressure drop.

Figure 2:
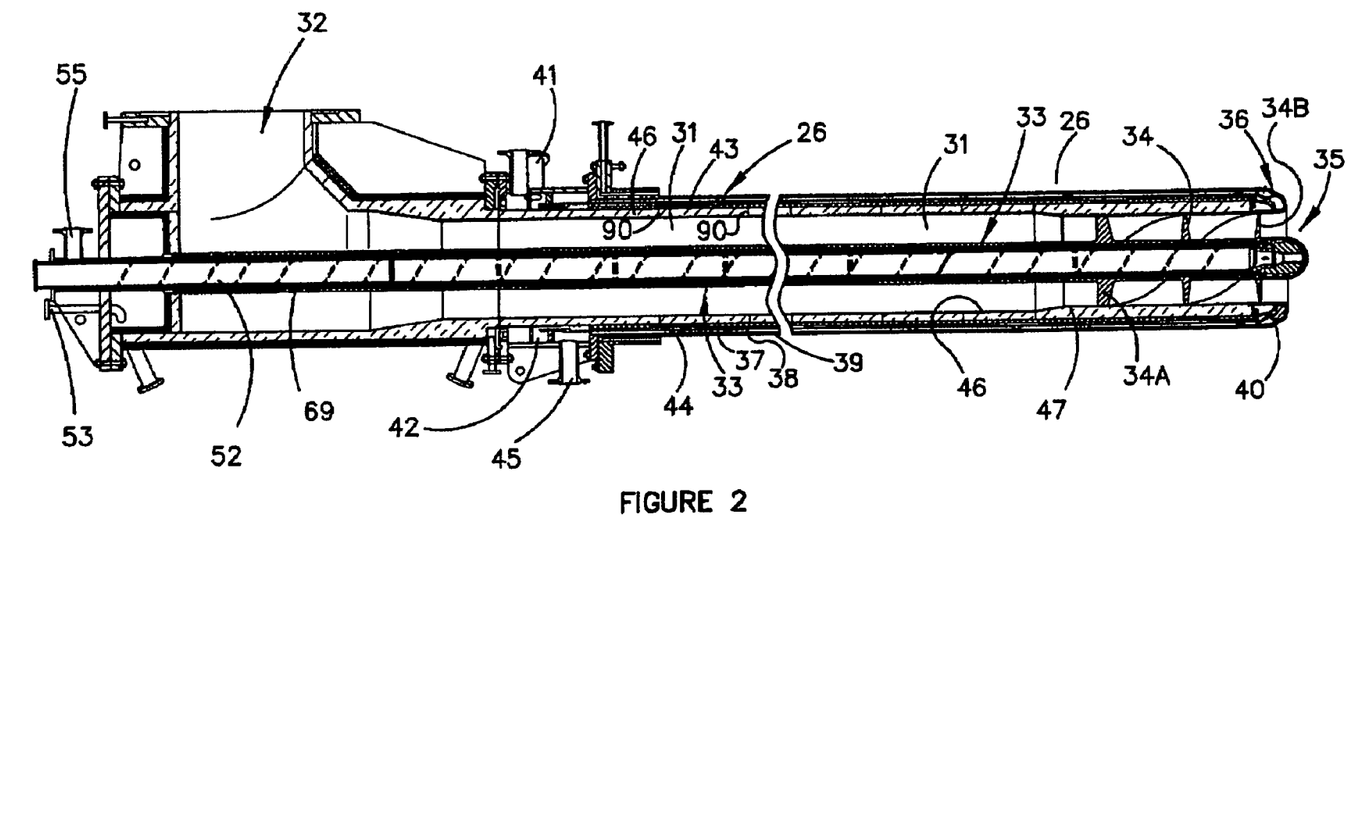
FIG. 2 is a longitudinal cross-section through the hot air injection lance.

The forward end of central structure 33 has a domed nose 35 which projects forwardly beyond the tip 36 of duct 31 so that the forward end of the central body and the duct tip co-act together to form an annular nozzle for divergent flow of gas from the duct with swirl imparted by the vanes 34.

Figure 4:
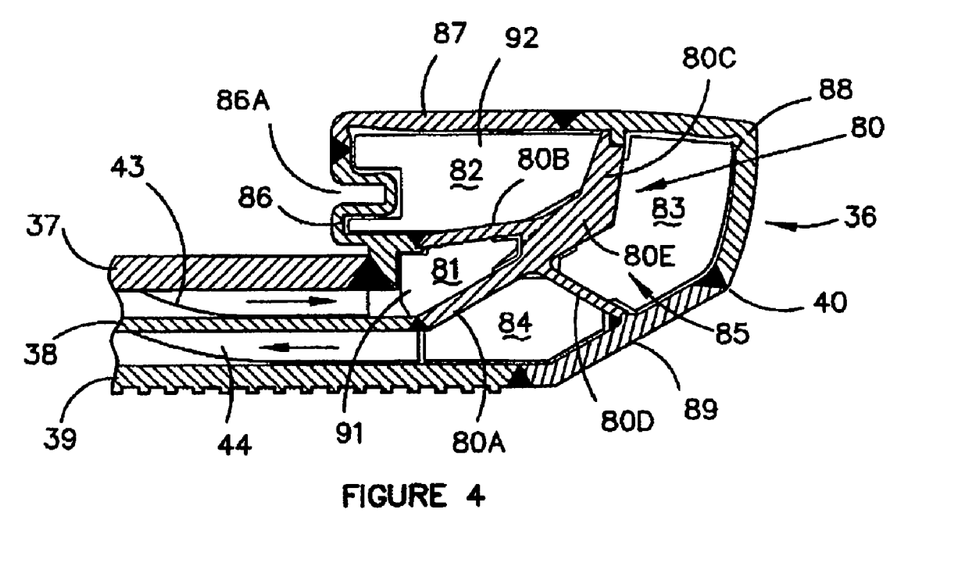
FIG. 4 is a detail to enlarged scale showing the construction of a duct tip at the forward end of an outer duct of the lance.
Figure 5:
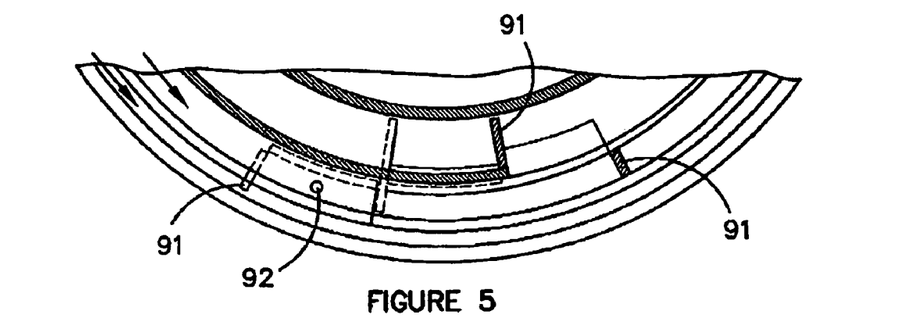
FIG. 5 is a partial cross-section through part of the duct tip.

The wall of the main part of duct 31 extending downstream from the gas inlet 32 is internally water cooled. This section of the duct is comprised of a series of three concentric steel tubes 37, 38, 39 extending to the forward end part of the duct where they are connected to the duct tip 36. The duct tip 36 is of hollow annular formation and is internally divided by a partitioning structure 80 which divides the interior of the tip into four water flow galleries 81, 82, 83, 84 which interconnect to form a single cooling water passage denoted generally as 85 to which cooling water is supplied and returned through passages in the wall of duct 31. Specifically, cooling water is supplied through an inlet 41 and annular inlet manifold 42 into an inner annular water flow passage 43 defined between the tubes 37, 38 of the duct through to the duct tip 36. Water is returned from the tip through an outer annular water return flow passage 44 defined between the tubes 38, 39 and backwardly to a water outlet 45 at the rear end of the water cooled section of duct 31.

Duct tip 36 has an outer shell 40 formed by four annular segments 86, 87, 88 and 89 which are welded together to form the outer shell. Segment 86 forms a rear wall of the duct tip 36 and is welded to the innermost tube 37 of the tubes constituting the wall of the duct. Partitioning structure 80 comprises a steel ring disposed within the tip shell 40 and provided with four circumferential flanges 80A, 80B, 80C and 80D projecting outwardly from a central part 80E of the ring so as to divide the interior of the shell into the water flow galleries 81-84 and to serve as buttress supports for the shell. Flange 80A is welded to the intermediate tube 38 of the duct wall and flanges 80B and 80D are welded to tip shell segments 86 and 89 to complete the interconnection of the tip to the duct wall and to divide the interior of the tip into the cooling water flow galleries 81, 82, 83 and 84. Baffles 91, are fitted between the partition structure 80 and the shell to define ends of the water flow galleries. Ports 92 are located in the flanges of the partitioning ring adjacent these baffles to cause the water to flow successively around the tip firstly through gallery 81 then through gallery 82 then through gallery 83 and finally to gallery 84. The water enters gallery 81 from the water flow passage 43 defined between the tubes 37, 38 of the duct and exits gallery 84 through return passage 44 defined between the tubes 38, 39.

The duct tip shell segments 87 and 88 defining the inner periphery and outer end of the tip are made of copper to enhance cooling of these parts of the tip whereas the segments 86 and 89 and the partitioning structure 80 are formed of steel to produce a very strong reinforced tip structure which allows for the transmission of load forces from the inner and intermediate tubes 37, 38 to the outer tube 39 of the duct as described in more detail below.

Figure 3:
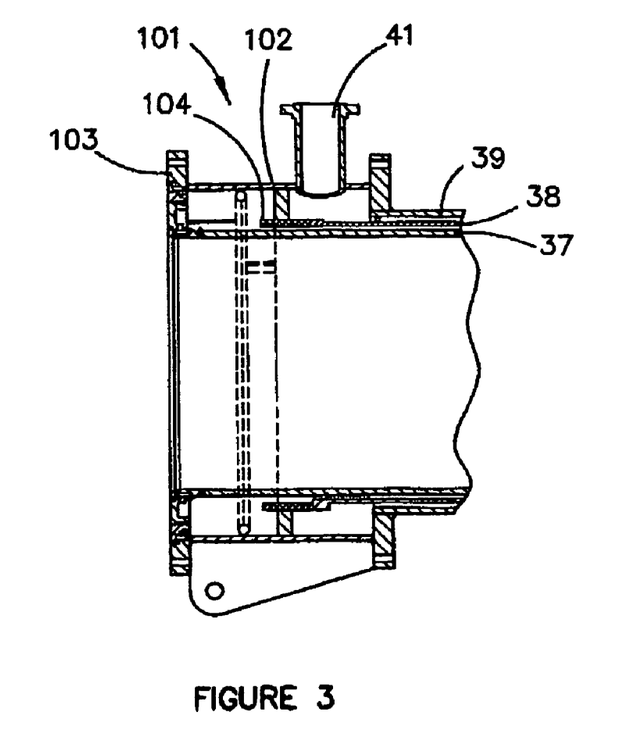
FIG. 3 illustrates a mounting assembly of the lance.

The lance is provided at its rear end with a mounting assembly 101 comprising a water cooled outer housing 102 connected to the outer duct tube 39 and to a mounting flange 103 for connection to an upper part of the vessel such that the lance will be suspended in a vertical orientation from the mounting flange with all of its weight taken through the outer duct tube 39. The rear end of the intermediate tube 38 is supported by a sliding seal 104 within the housing 102 and the rear end of the inner tube 39 is a sliding fit in the mounting flange 103 to permit relative longitudinal movements of the tubes on differential expansion of the various lance components.

The water cooled section of duct 31 is internally lined with an internal refractory lining 46 that fits within the innermost metal tube 39 of the duct and extends through to the water cooled tip 36 of the duct. The inner periphery of duct tip 36 is generally flush with the inner surface of the refractory lining which defines the effective flow passage for gas through the duct. The forward end of the refractory lining has a slightly reduced diameter section 47 which is generally flush with the inner periphery of the duct tip 36. The refractory lining is formed in sections fitted within the inner duct tube 37. When the lance is installed and in a vertical condition, the bottom section of the lining sits on the rear wall 86 of the duct tip and the other lining sections are supported on bricking rings 90 welded to the tube 39. Accordingly, the full weight of the refractory lining is imparted downwardly on to the inner tube 37 of the duct. Since the duct is fully supported by its upper end through the outer tube 39, this downward loading must be transferred from the inner tube to the outer tube through the interconnection provided by the tip wall 86, the partitioning structure 80 and the tip structure 89 all of which are made of steel and which provide a very solid rigid and braced interconnection capable of transmitting those forces.

Rearwardly from section 47 the refractory lining is of slightly greater diameter to enable the central structure 33 to be inserted downwardly through the duct on assembly of the lance without fouling the refractory. The swirl vanes 34 are then moved within the reduced diameter section of the refractory until their forward ends enter within the rearmost part of the duct tip 36. In the final assembly the vanes extend along central structure 33 from rear ends 34A spaced rearwardly from the duct tip 36 to forward ends 34B disposed within the duct tip. Vanes 34 are dimensioned so that there is a small radial clearance between the vanes and the refractory lining of the duct. They are also dimensioned so that when the lances is in a cold condition there is a small radial clearance of the order of 2 mm between the forward ends of the vanes and the inner periphery of the duct tip 36 but on thermal expansion under operating conditions the forward ends of the vanes are engaged by the internally water cooled tip which then provides lateral support for the vanes and the lower end of the central structure 33. The central structure is long and flexible and if it is not supported the gas blast can cause severe vibration. With the illustrated arrangement lateral support is provided through the engagement of the cooled tip with the vanes. The vanes may be made of a cobalt alloy material such as UMCO 50. They may be formed on a sleeve simply fitted over the lower end of the central structure and keyed to prevent rotation.

The rear wall 86 of duct tip 36 is formed with a deformable midsection to accommodate radial loading on the wall on engagement with the front ends of the vanes 34. More specifically, the annular tip shell segment forming that wall is provided with a deformable corrugation 86A of U-shaped cross-section which can close up to accommodate excess loading on the wall so as to limit stresses in the wall under radial loads generated by thermal movements under the severe operating conditions generated by the HIsmelt process.

The front end of central structure 33 which carries the swirl vanes 34 is internally water cooled by cooling water supplied forwardly through the central structure from the rear end to the forward end of the lance and then returned back along the central structure to the rear end of the lance. This enables a very strong flow of cooling water directly to the forward end of the central structure and to the domed nose 35 in particular which is subjected to very high heat flux in operation of the lance.

Figures 6, 7:
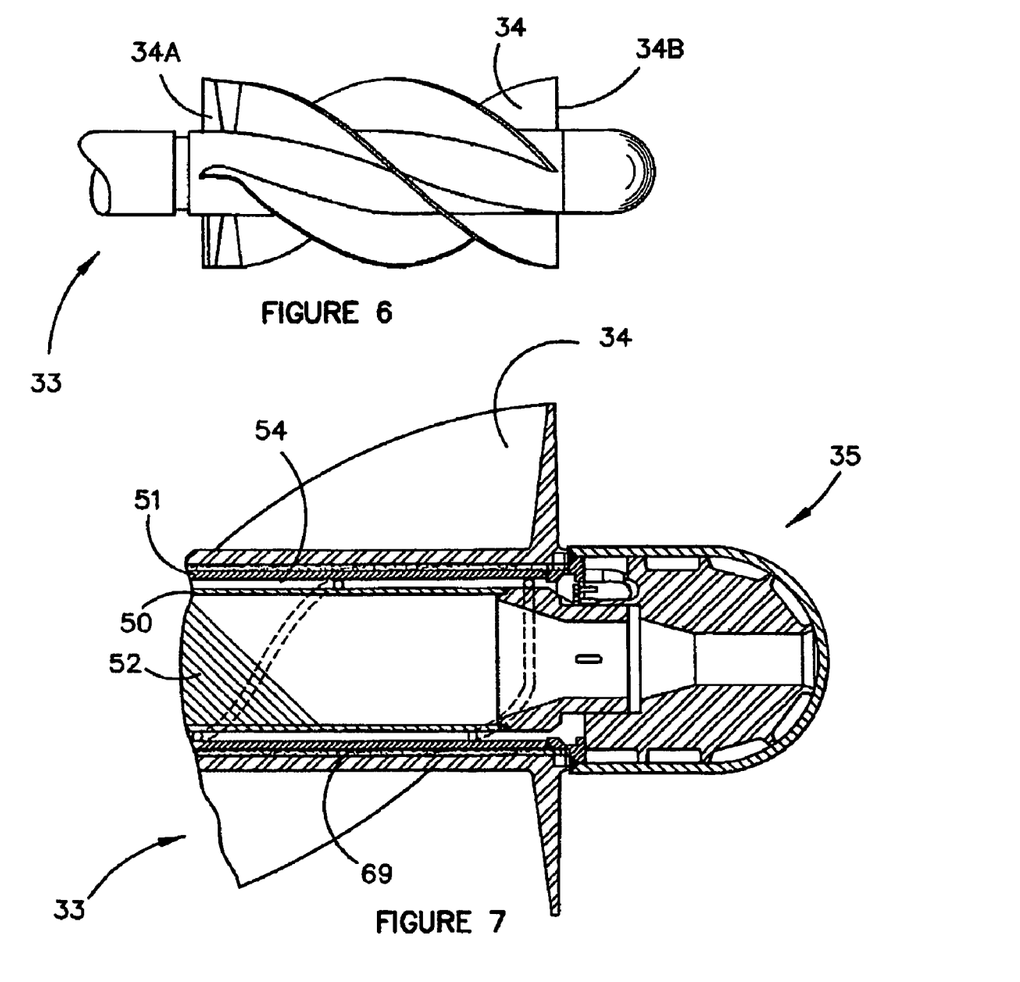
FIGS. 6 and 7 illustrate the construction of a front part of a central structure of the lance.

Central structure 33 comprises inner and outer concentric steel tubes 50, 51 formed by tube segments, disposed end to end and welded together. Inner tube 50 defines a central water flow passage 52 through which water flows forwardly through the central structure from a water inlet 53 at the rear end of the lance through to the front end nose 35 of the central structure and an annular water return passage 54 defined between the two tubes through which the cooling water returns from nose 35 back through the central structure to a water outlet 55 at the rear end of the lance.

Figure 8:
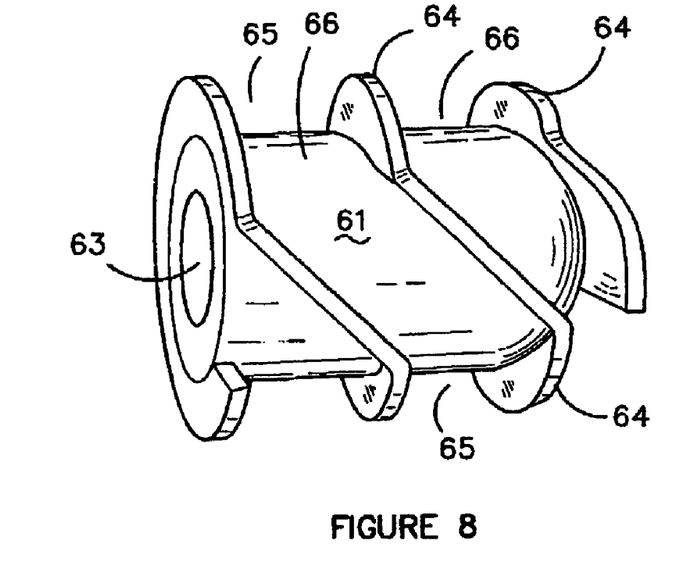
FIGS. 8 and 9 illustrate the construction of a forward nose end of the central structure of the lance.
Figure 9:
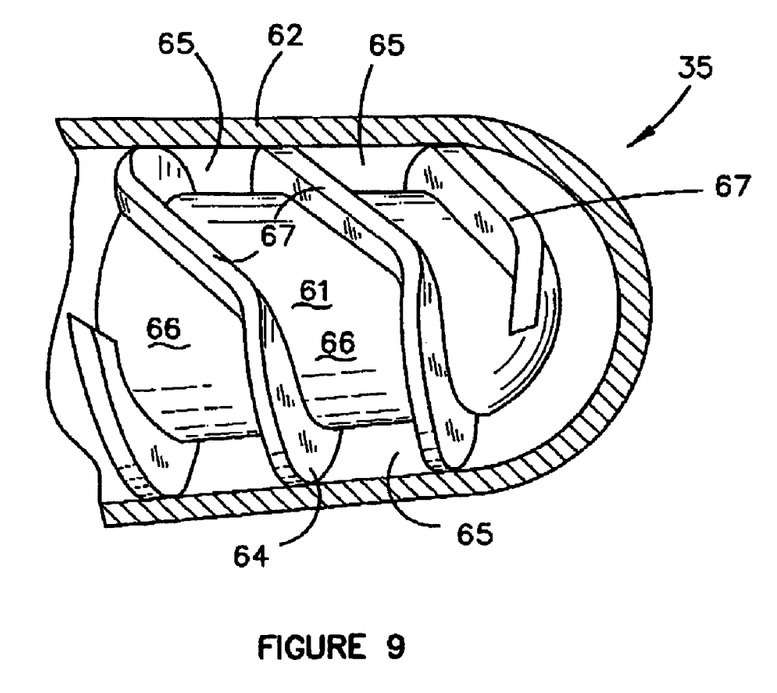

The nose end 35 of central structure 33 comprises an inner copper body 61 fitted within an outer domed nose shell 62 also formed of copper. The inner copper piece 61 is formed with a central water flow passage 63 to receive water from the central passage 52 of structure 33 and direct it to the tip of the nose. Copper body 61 is formed with projecting ribs 64 which fit snugly within the nose shell 62 to define a single continuous cooling water flow passage 65 between the copper body 61 and the outer nose shell 62. The ribs 64 are shaped so that the single continuous passage 65 extends as annular passage segments 66 interconnected by passage segments 67 sloping from one annular segment to the next. Thus passage 65 extends from the tip of the nose in a spiral which, although not of regular helical formation, does spiral around and back along the nose to exit at the rear end of the nose into the annular return passage formed between the tubes 51, 52 of central structure 33.

The forced flow of cooling water in a single coherent stream through spiral passage 65 extending around and back along the nose end 35 of central structure ensures efficient heat extraction and avoids the development of "hot spots" on the nose which could occur if the cooling water is allowed to divide into separate streams at the nose. In the illustrated arrangement the cooling water is constrained in a single stream from the time that it enters the nose end 35 to the time that it exits the nose end.

Inner structure 33 is provided with an external heat shield 69 to shield against heat transfer from the incoming hot gas flow in the duct 31 into the cooling water flowing within the central structure 33. If subjected to the very high temperatures and high gas flows required in a large scale smelting installation, a solid refractory shield may provide only short service. In the illustrated construction the shield 69 is formed of tubular sleeves of ceramic material marketed under the name UMCO. These sleeves are arranged end to end to form a continuous ceramic shield surrounding an air gap between the shield and the outermost tube 51 of the central structure. Further details of the manner in which the shield may be formed will be found in the disclosure of U.S. Pat. No. 6,673,305.

The invention claimed is:

1. An apparatus for injecting gas into a vessel, comprising:
a gas flow duct extending from a rear end to a forward end from which to discharge gas from the duct;
an elongate central structure extending within the gas flow duct from its rear end to its forward end;

a plurality of flow directing vanes disposed about the central structure adjacent the forward end of the duct to impart swirl to a gas flow through the forward end of the duct;

cooling water supply and return passages extending through the wall of the gas flow duct and extending from the rear end to the forward end of the gas flow duct for supply and return of cooling water to the forward end of the duct; and an annular duct tip disposed at the forward end of the duct and having an internal cooling water passage connecting with the cooling water supply and return passages so as to receive and return a flow of cooling water to internally cool the duct tip, the flow directing vanes being mounted on the central structure so as to extend along the central structure from rear ends set rearwardly of the duct tip to forward ends disposed within the duct tip and dimensioned such that during operation of the apparatus their forward ends are engaged and supported by the internally water cooled duct tip;

wherein a rearmost part of the duct tip has a radially outwardly extending annular rear wall formed with a corrugation deformable to accommodate radial loading on the wall on engagement with the forward ends of the vanes, and wherein the forward ends of the vanes are disposed within a rearmost part of the duct tip so as to be engaged only by that rearmost part of the tip.

2. The apparatus of claim 1, wherein the corrugation is generally of U-shaped cross-section.

3. The apparatus of claim 1, wherein rear ends of the vanes have a smooth transition from initial straight sections to helical formation.

4. The apparatus of claim 1, wherein the wall of the gas flow duct comprises three concentric tubes defining inner and outer annular spaces providing the cooling water supply and return passages.

5. The apparatus of claim 4, wherein the forward ends of the duct tubes are connected to the duct tip.

6. The apparatus of claim 1, wherein the duct tip is of hollow annular formation and is internally divided by a partitioning structure to form said cooling water passage in the tip.

7. The apparatus of claim 1, configured to inject gas into a vessel.

8. The apparatus of claim 7, wherein said vanes are dimensioned so that when the lance is in a cold condition there is a radial clearance between the forward ends of the vanes and the duct tip.

9. The apparatus of claim 8, wherein the clearance is in the order of 2 mm.

* * * * *

UNITED STATES PATENT AND TRADEMARK OFFICE
CERTIFICATE OF CORRECTION

PATENT NO. : 7,481,965 B2 Page 1 of 1
APPLICATION NO. : 11/249504
DATED : January 27, 2009
INVENTOR(S) : Williams et al.

It is certified that error appears in the above-identified patent and that said Letters Patent is hereby corrected as shown below:

Title page, item (75), line 3, "South Oakleigh" should read --Bentleigh East--.

Signed and Sealed this

Thirtieth Day of June, 2009

JOHN DOLL
*Acting Director of the United States Patent and Trademark Office*